(12) United States Patent
Chen

(10) Patent No.: US 6,428,115 B1
(45) Date of Patent: Aug. 6, 2002

(54) BICYCLE WHEEL RIM CAPABLE OF PREVENTING DISENGAGEMENT OF BICYCLE TIRE THEREFROM

(76) Inventor: Chao-Ying Chen, No. 21-2, Pei-Shi Chou, Min-Ho Village, Shan-Shang Hsiang, Tainan Hsien (TW)

( * ) Notice: Subject to any disclaimer, the term of this patent is extended or adjusted under 35 U.S.C. 154(b) by 0 days.

(21) Appl. No.: 09/770,812

(22) Filed: Jan. 26, 2001

(30) Foreign Application Priority Data

Nov. 24, 2000 (TW) ........................................ 89220457 U

(51) Int. Cl.[7] .............................................. B60B 21/12
(52) U.S. Cl. ............................ 301/95.106; 152/381.5; 152/427; 152/516
(58) Field of Search ....................... 301/95.101, 95.104, 301/95.106; 152/381.3, 381.5, 381.6, 516, 520, 427

(56) References Cited

U.S. PATENT DOCUMENTS

| | | | |
|---|---|---|---|
| 2,844,180 A | * | 7/1958 | Omeron |
| 3,877,503 A | * | 4/1975 | Tangorra et al. .......... 152/379.3 |
| 4,401,144 A | * | 8/1983 | Wilde .......................... 152/520 |
| 4,794,970 A | * | 1/1989 | Huinink et al. ............. 152/520 |
| 5,271,444 A | * | 12/1993 | Chen ........................... 152/520 |
| 6,089,672 A | * | 7/2000 | Chen ...................... 301/95.106 |

* cited by examiner

Primary Examiner—Russell D. Stormer
(74) Attorney, Agent, or Firm—Vinson & Elkins LLP

(57) ABSTRACT

A bicycle wheel rim includes a rim body with annular left and right tire retaining walls, an annular spoke mounting wall, and a tire retaining cavity. The tire retaining walls are spaced apart from each other. Each of the tire retaining walls has a radial inner edge proximate to a central axis of the rim body, and a radial out edge distal to the central axis. The spoke mounting wall interconnects the radial inner edges of the tire retaining walls, and is formed with a set of spoke mounting holes. The tire retaining cavity is formed between the tire retaining walls, and is configured to have two opposite lateral cavity parts and an intermediate cavity part between the lateral cavity parts. The lateral cavity parts are deeper than the intermediate cavity part with respect to the radial out edges of the tire retaining walls.

10 Claims, 8 Drawing Sheets

BICYCLE WHEEL RIM CAPABLE OF PREVENTING DISENGAGEMENT OF BICYCLE TIRE THEREFROM

BACKGROUND OF THE INVENTION

1. Field of the Invention

The present invention relates to a bicycle wheel rim, more particularly to a bicycle wheel rim capable of effectively preventing disengagement of a bicycle tire therefrom.

2. Description of the Related Art

As shown in FIG. 1, a first conventional bicycle wheel rim includes an annular rim body with spaced-apart left and right tire retaining walls 12 and a spoke mounting wall 11 interconnecting the tire retaining walls 12. The spoke mounting wall 11 is formed with a plurality of angularly displaced spoke mounting holes 15 which are arranged along the length of the spoke mounting wall 11 for retaining spoke fasteners 16 of spokes 10 therein. The tire retaining walls 12 and the spoke mounting wall 11 cooperatively confine a tire retaining space 14 for retaining a bicycle tire 1 therein. The bicycle tire 1 typically includes an inflatable inner tire body 17 and an outer tire body 18 enclosing the inner tire body 17. A lining 19 is disposed between the inner tire body 17 and the spoke mounting wall 11 to protect the inner tire body 17 from being pierced by the spoke fasteners 16. When the inner tire body 17 is inflated after installation of the inner and outer tire bodies 17, 18 on the wheel rim 1, the outer tire body 18 is stretched to engage two opposite hooked edges 181 thereof with hooked radial outer edges 13 of the tire retaining walls 12. However, once the inner tire body 17 is accidentally deflated, or in the case the inner tire body 17 is not fully inflated, the opposite hooked edges 181 of the outer tire body 18 could be easily disengaged from the radial outer edges 13 of the tire retaining walls 12.

FIGS. 2 and 3 illustrate another conventional bicycle wheel rim 2 suitable for use with a bicycle tire which includes only an outer tire body 20 and which is free of an inner tire body. The bicycle wheel rim 2 includes annular left and right tire retaining walls 23 spaced apart from each other, a spoke mounting wall 21 interconnecting radial inner edges of the tire retaining walls 23, and an annular connecting wall 26 disposed around the spoke mounting wall 21 and extending between intermediate sections of the tire retaining walls 23. A tire retaining space 24 is formed among the connecting wall 26 and tire retaining walls 23. To facilitate installation of the tire body 20, the connecting wall 26 is configured to have a central indented portion 261 that is indented in a radial inward direction to define an annular recess 22. During installation, two confronting edge portions 201 of the tire body 20 are extended into the recess 22 so as to be temporarily retained therein. Thereafter, high pressure air is pumped into an interior of the tire body 20 to inflate the same. At this time, the edge portions 201 are forced to move away from each other and move out of, the recess 22 so as to engage radial outer edges 25 of the tire retaining walls 23, respectively. However, since the tire body 20 engages the recess 22 before inflation, high pressure air is required to inflate the tire body 20. The bicycle wheel rim 2 is still not satisfactory.

SUMMARY OF THE INVENTION

Therefore, the main object of the present invention is to provide a bicycle wheel rim capable of effectively preventing disengagement of a bicycle tire therefrom.

Accordingly, the bicycle wheel rim of the present invention includes an annular rim body with a central axis. The rim body has annular left and right tire retaining walls, an annular spoke mounting wall, and a tire retaining cavity. The tire retaining walls are spaced apart from each other. Each of the tire retaining walls has a radial inner edge proximate to the central axis of the rim body, and a radial outer edge distal to the central axis of the rim body. The spoke mounting wall interconnects the radial inner edges of the tire retaining walls, and is formed with a set of spoke mounting holes adapted for retaining spoke fasteners therein. The tire retaining cavity is formed between the tire retaining walls, and is configured to have two opposite lateral cavity parts proximate to the tire retaining walls, respectively, and an intermediate cavity part between the lateral cavity parts. The lateral cavity parts are deeper than the intermediate cavity part with respect to the radial outer edges of the tire retaining walls.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
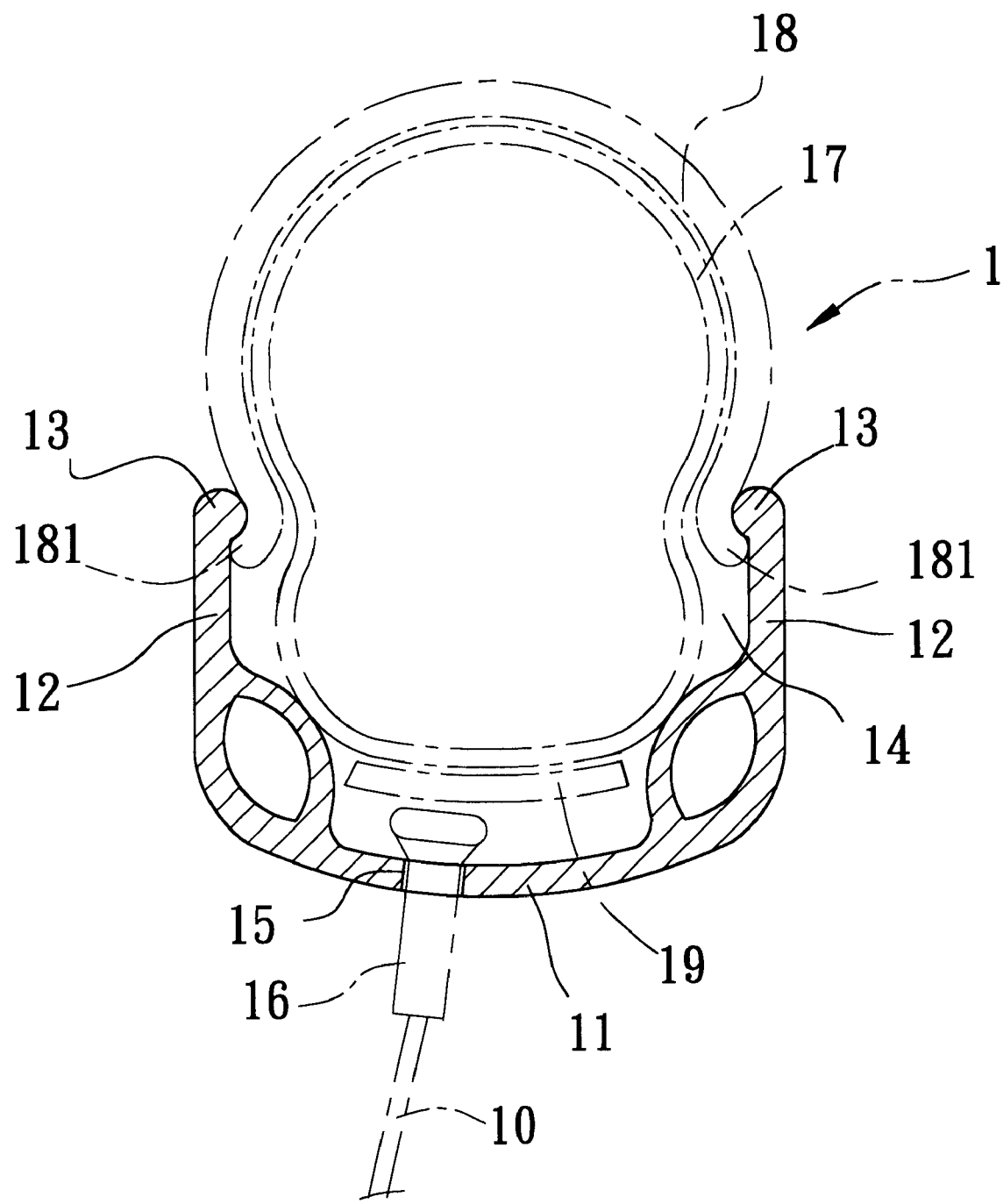
FIG. 1 is a fragmentary cross-sectional view of a conventional bicycle wheel rim.
Figure 2:
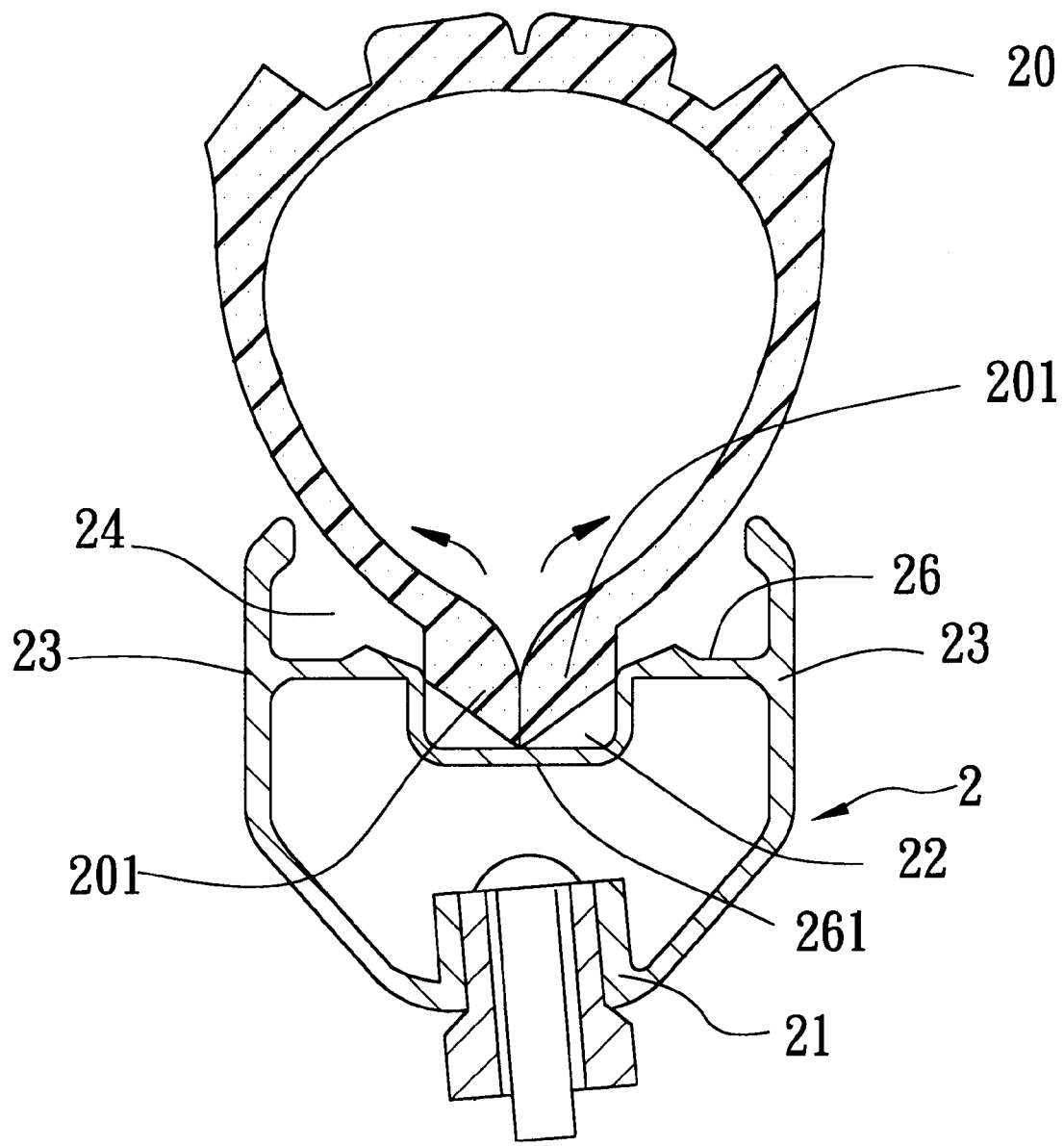
FIG. 2 is a fragmentary cross-sectional view of another conventional bicycle wheel rim when installed with an outer tire body before inflation of the outer tire body.
Figure 3:
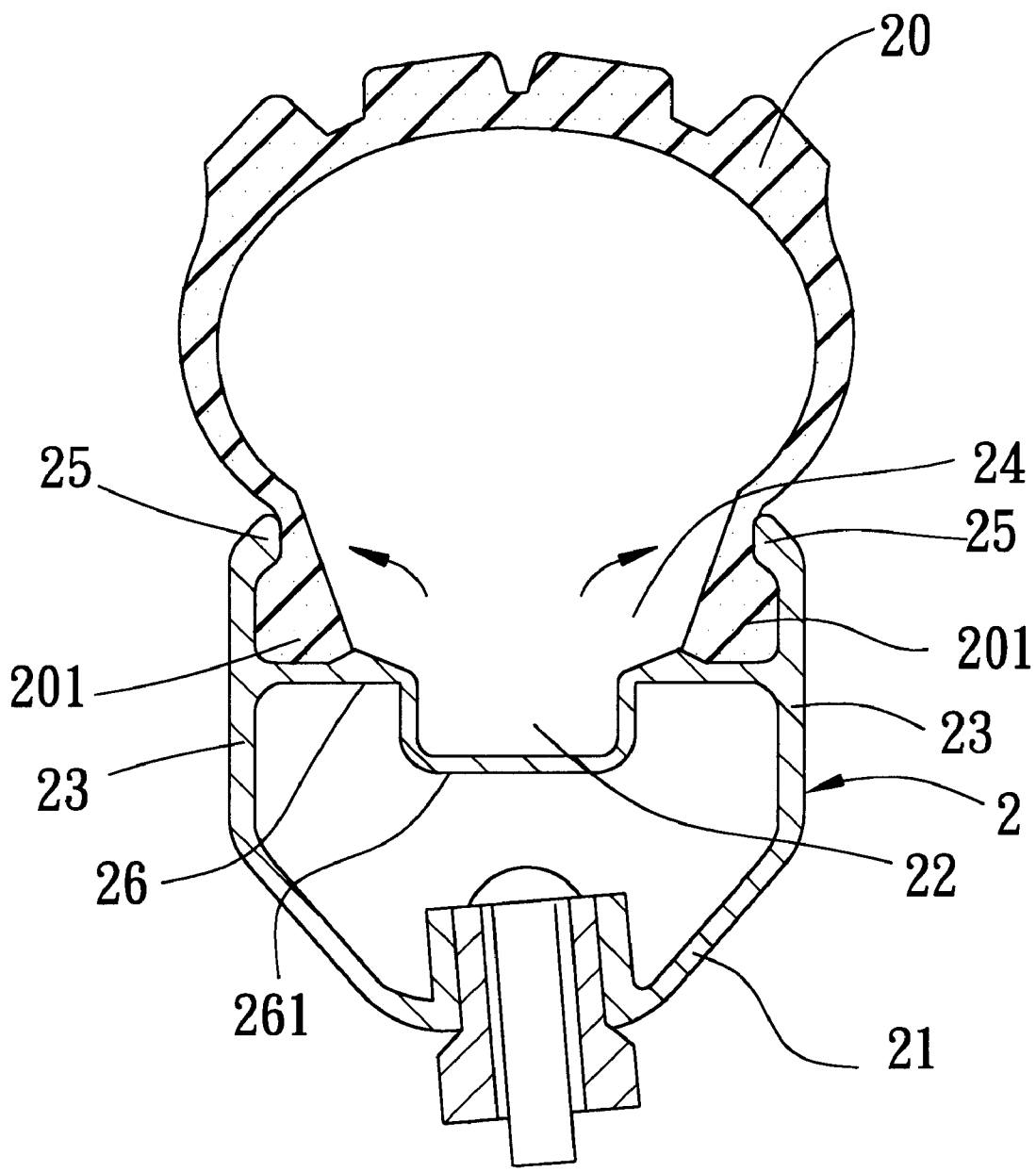
FIG. 3 is a fragmentary cross-sectional view of the conventional bicycle wheel rim of FIG. 2 after inflation of the outer tire body.

Before the present invention is described in greater detail, it should be noted that like elements are denoted by the same reference numerals throughout the disclosure.

Figure 4:
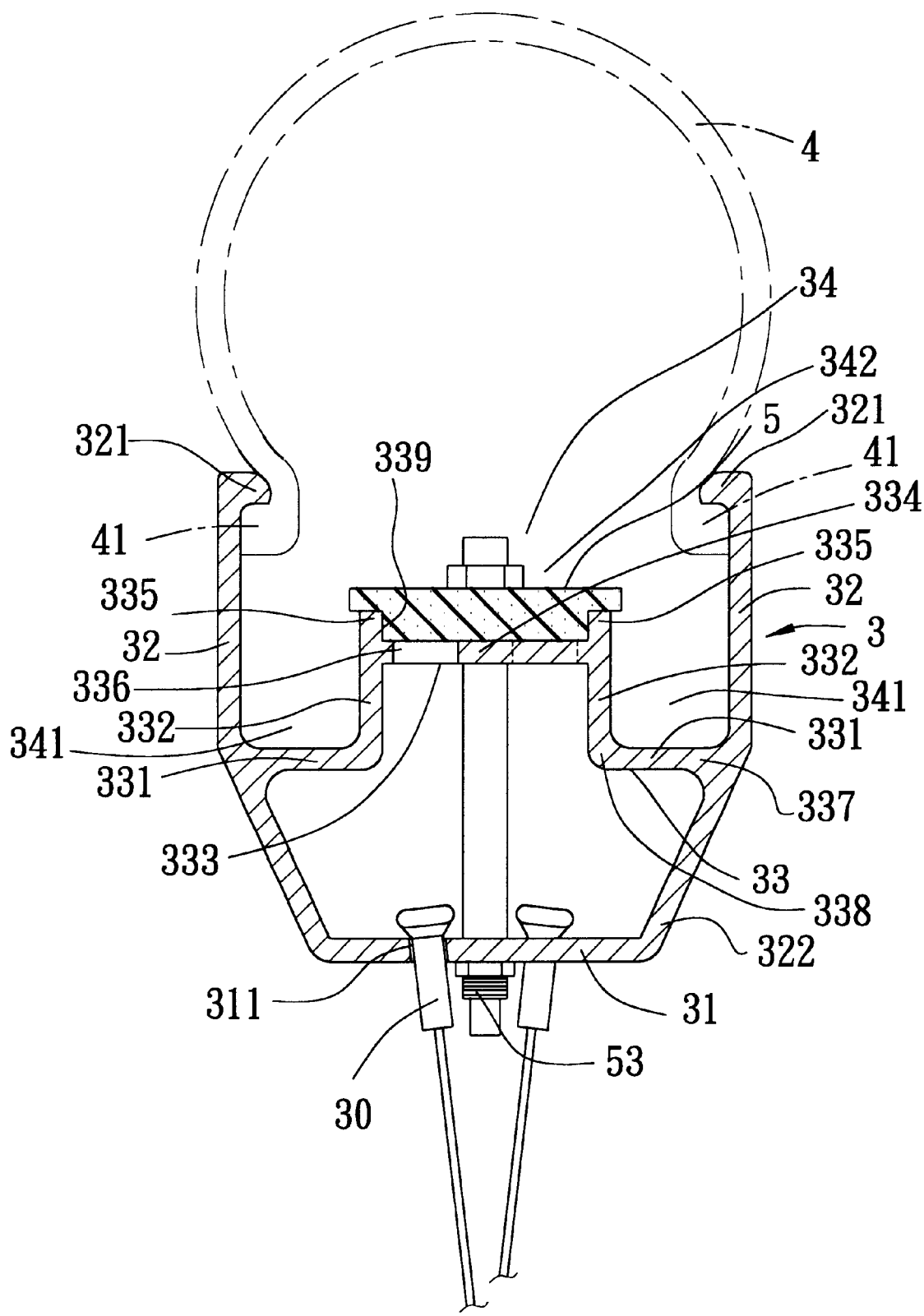
FIG. 4 is a fragmentary cross-sectional view of a first preferred embodiment of a bicycle wheel rim of the present invention, where an outer tire body is shown in an inflated state.
Figure 5:
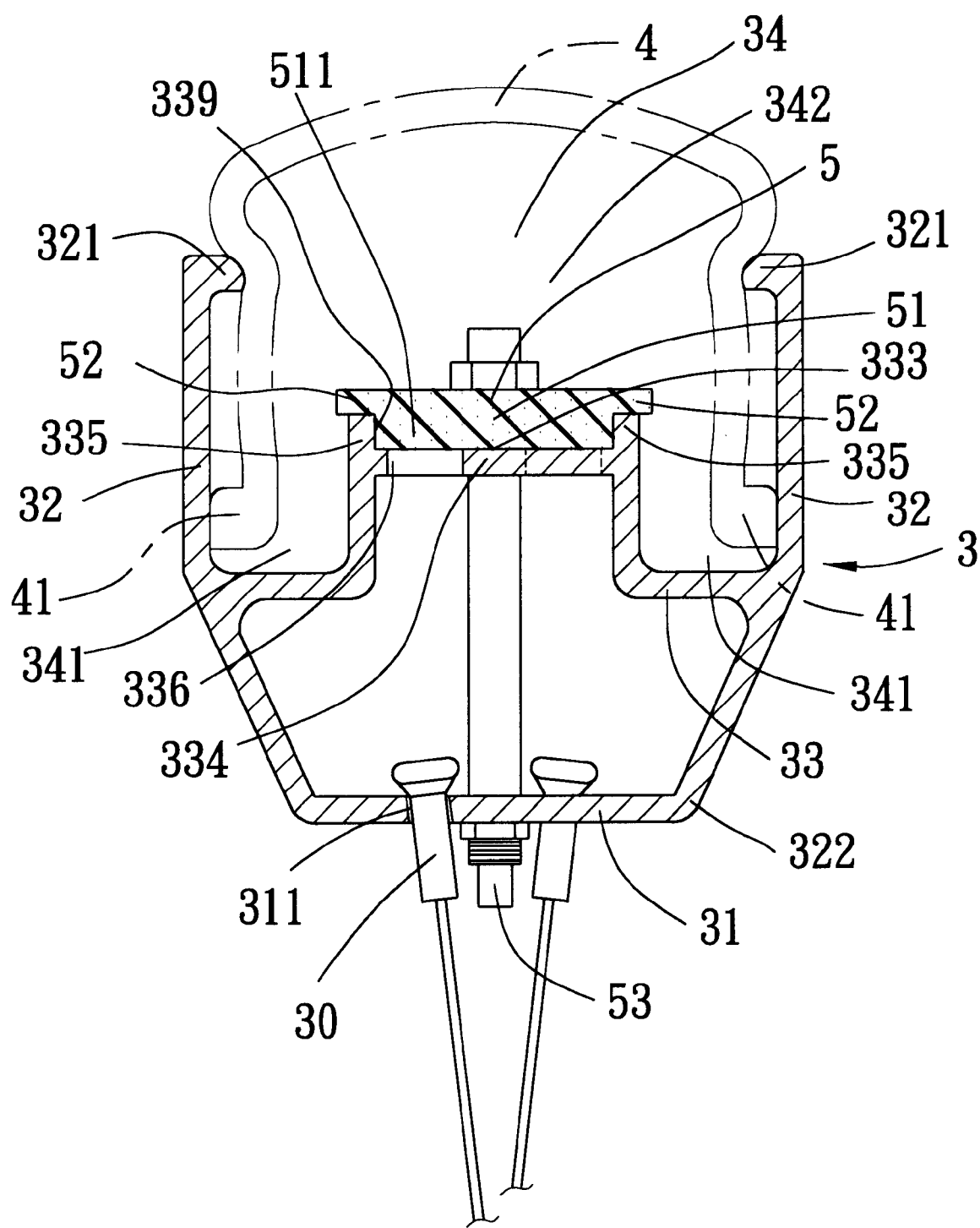
FIG. 5 is another fragmentary cross-sectional view of the bicycle wheel rim of FIG. 4, where the outer tire body is shown to be in a deflated state.

Referring to FIGS. 4 and 5, the first preferred embodiment of the bicycle wheel rim 3 of the present invention is shown to include an annular rim body which is formed integrally as a metal extrusion. The rim body has annular left and right tire retaining walls 32, and an annular spoke mounting wall 31 interconnecting the left and right tire retaining walls 32. Each of the tire retaining walls 32 has a radial inner edge 322 proximate to a central axis of the annular rim body, a radial outer edge 321 distal to the central axis, and an intermediate portion between the radial inner and radial outer edges 322, 321. The radial outer edges 321 bend inwardly toward each other so as to be adapted to engage edge portions 41 of an outer tire body 4. The spoke mounting wall 31 extends between the radial inner edges 322 of the tire retaining walls 32 to interconnect the same, and is formed with a set of spoke mounting holes 311 which are angularly displaced from one another and which are adapted for retaining spoke fasteners 30 therein. An annular connecting wall 33 is disposed around and is spaced apart from the spoke mounting wall 31, and extends between the intermediate portions of the tire retaining walls 32 to interconnect the same. The connecting wall 33 has a pair of lateral sections 331 formed adjacent and connected to the tire retaining walls 32, and an intermediate section 333 which interconnects the lateral sections 331 and which projects radially and outwardly relative to the lateral sections 331. The connecting wall 33 cooperates with radial outer sections of the tire retaining walls 32 to define a tire retaining cavity 34 which includes a pair of lateral cavity parts 341 on opposite sides of the intermediate section 333 of the connecting wall 33 and adjacent to the tire retaining walls 32, and an intermediate cavity part 342 between the lateral cavity parts 341. The lateral cavity parts 341 are deeper than the intermediate cavity part 342 with respect to the radial outer edges 321 of the tire retaining walls 32. Each of the lateral sections 331 of the connecting wall 33 has an outer terminating edge 337 formed adjacent and connected to a respective one of the tire retaining walls 32, and an inner terminating edge 338 opposite to the outer terminating edge 337. The intermediate section 333 of the connecting wall 33 includes a pair of side walls 332 extending radially and outwardly from the inner terminating edges 338 of the lateral sections 331, and a bridging wall 334 extending transversely between the side walls 332. The side walls 332 project radially and outwardly relative to the bridging wall 334 to form a pair of ribs 335 adjacent to two opposite ends of the bridging wall 334. The ribs 335 and the bridging wall 334 cooperatively define a recess 339 which opens in a radial outward direction. The bridging wall 334 is formed with a set of spoke passage holes 336 aligned respectively with the spoke mounting holes 311 in the spoke mounting wall 31 and adapted to permit passage of the spoke fasteners 30 therethrough.

An annular lining 5 is disposed on the intermediate section 333 of the connecting wall 33. The lining 5 has two opposite lateral rim portions 52 resting on the ribs 335, respectively, and an intermediate covering portion 51 extending between the rim portions 52. The intermediate covering portion 51 has a fitting projection 511 which extends into the recess 339 for covering the spoke passage holes 336 in a fluid-tight manner. A valve unit 53 is mounted on the spoke mounting wall 31, and extends in a radial direction through the bridging wall 334 and the lining 5 to permit inflation of the outer tire body 4.

To inflate the outer tire body 4 after installation of the same on the wheel rim 3, air is pumped into an interior of the tire body 4 via the valve unit 53. The outer tire body 4 is moved radially and outwardly during inflation to enable the edge portions 41 of the outer tire body 4 to engage the radial outer edges 321 of the tire retaining walls 32. After inflation of the outer tire body 4, the air pressure in the interior of the outer tire body 4 enables the lining 5 to abut tightly against the intermediate section 333 of the connecting wall 33 to prevent leakage of air through the spoke passage holes 336.

Figure 6:
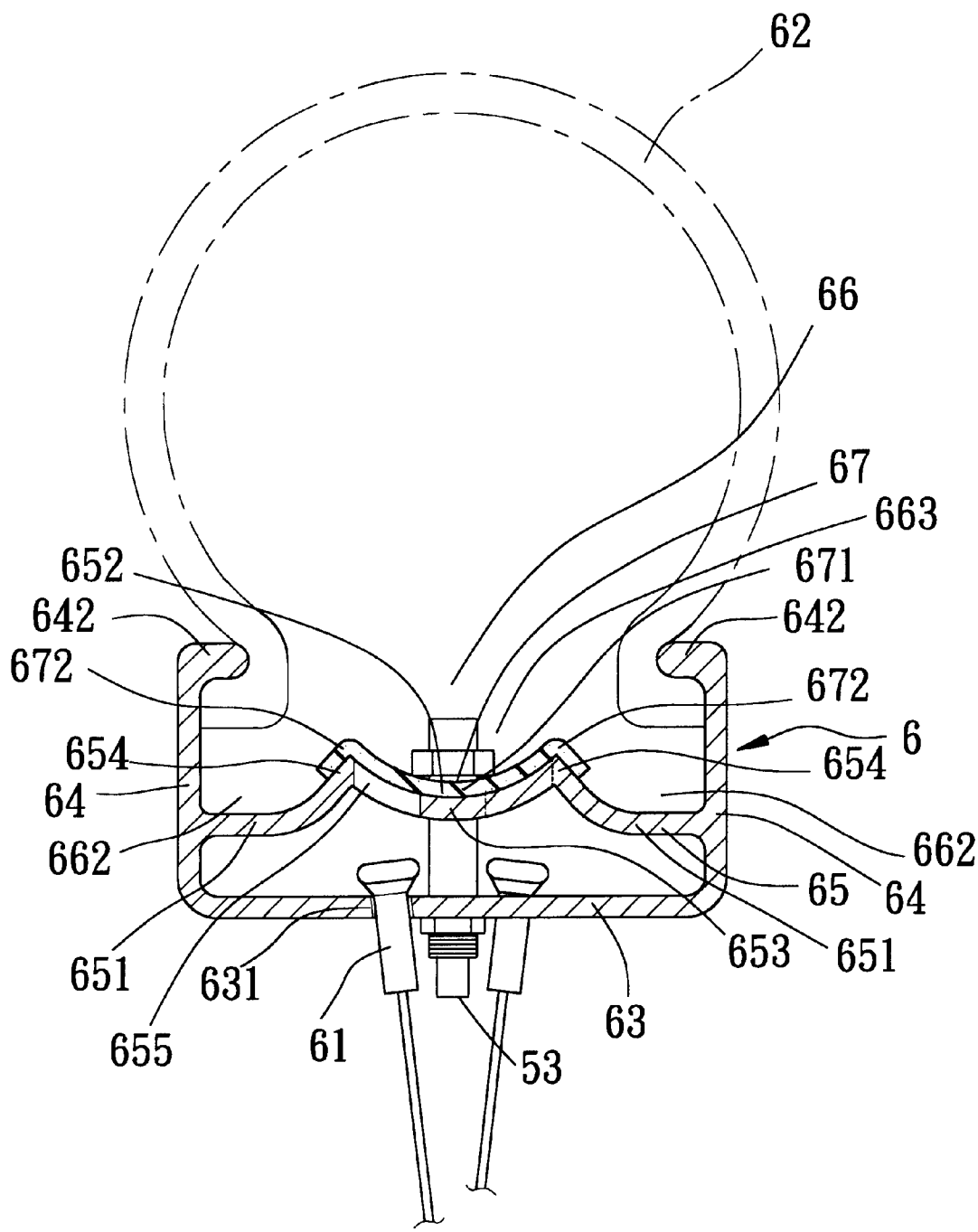
FIG. 6 is a fragmentary cross-sectional view of a second preferred embodiment of the bicycle wheel rim of the present invention.

Referring to FIG. 6, the bicycle wheel rim 6 of the second preferred embodiment of the present invention is shown to also include an integrally formed annular rim body having annular left and right tire retaining walls 64, and an annular spoke mounting wall 63 interconnecting radial inner edges of the left and right tire retaining walls 64. The spoke mounting wall 63 is formed with a set of spoke mounting holes 631 which are angularly displaced from one another and which are adapted for retaining spoke fasteners 61 thereon. An annular connecting wall 65 is disposed around the spoke mounting wall 63 and is spaced apart from the spoke mounting wall 63. The connecting wall 65 extends between intermediate portions of the tire retaining walls 64 to interconnect the same. The connecting wall 65 has a pair of lateral sections 651 formed adjacent and connected to the tire retaining walls 64, and an intermediate section 652 interconnecting the lateral sections 651. The intermediate section 652 is disposed in a radial outward position relative to the lateral sections 651, and has a pair of rib portions 654 which project radially and outwardly and which are formed adjacent to the lateral sections 651, respectively, and a bridging portion 653 interconnecting the rib portions 654. The connecting wall 65 cooperates with radial outer sections of the tire retaining walls 64 to define a tire retaining cavity 66 which includes a pair of lateral cavity parts 662 on opposite sides of the intermediate section 652 and proximate to the tire retaining walls 64, and an intermediate cavity part 663 between the lateral cavity parts 662. The lateral cavity parts 662 are deeper than the intermediate cavity part 663 with respect to the radial outer edges 642 of the tire retaining walls 64. The bridging portion 653 is formed with a set of spoke passage holes 655 aligned respectively with the spoke mounting holes 631 in the spoke mounting wall 63. A lining 67 is laid on the intermediate section 652 of the connecting wall 65, and has a pair of rim portion 672 lying over the rib portions 654 and an intermediate covering portion 671 lying over the bridging portion 653 to cover the spoke passage holes 655. As with the previous embodiment, a valve unit 53 is mounted on the spoke mounting wall 63 and extends through the intermediate section 652 of the connecting wall 65 and the lining 67 to permit inflation of an outer tire body 62 that is installed in the tire retaining cavity 66.

Figure 7:
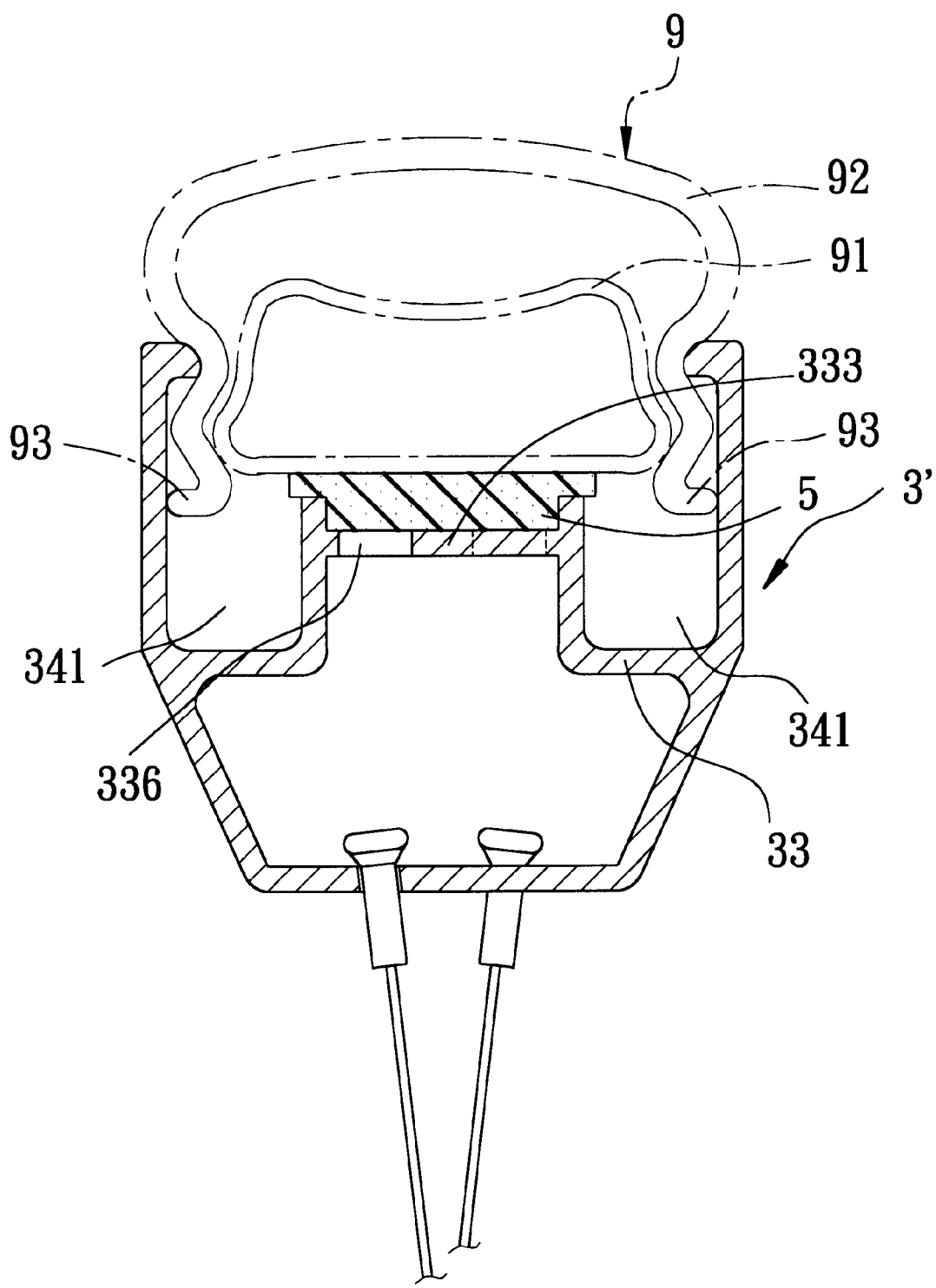
FIG. 7 is a fragmentary cross-sectional view of a third preferred embodiment of the bicycle wheel rim of the present invention.

The bicycle wheel rim of the present invention is also suitable for use with a bicycle tire having both inner and outer tire bodies. Referring to FIG. 7, the third preferred embodiment of the bicycle wheel rim 3' of the present invention is shown to be similar to the bicycle wheel rim 3 of the first preferred embodiment shown in FIG. 4, except that the valve unit 53 is omitted therefrom. The bicycle wheel rim 3' of the present embodiment is adapted to be installed with a bicycle tire 9 which includes an inflatable inner tire body 91 and an outer tire body 92 that encloses the inner tire body 91. The inner tire body 91 is disposed on the lining 5, which is laid on the radially and outwardly projecting intermediate section 333 of the connecting wall 33 and which protects the inner tire body 91 from being pierced by edge portions of the spoke passage holes 336. When the inner tire body 91 is accidentally deflated, the opposite edges 93 of the outer tire body 92 extend into the lateral cavity parts 341 and can be retained therein. The outer tire body 91 is thus prevented from disengaging from the bicycle wheel rim 3'.

Figure 8:
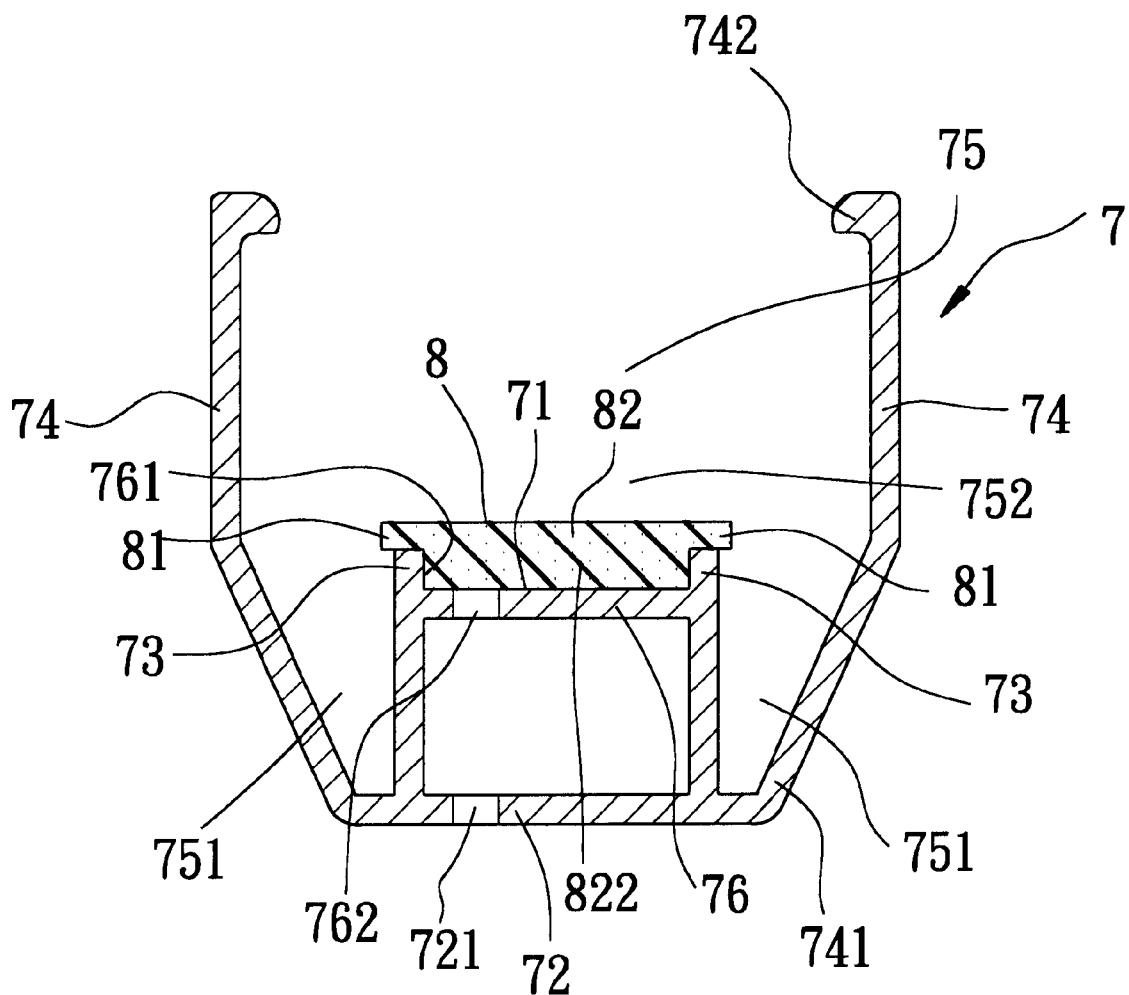
FIG. 8 is a fragmentary cross-sectional view of a fourth preferred embodiment of the bicycle wheel rim of the present invention.

Referring to FIG. 8, the fourth preferred embodiment of the bicycle wheel rim 7 of the present invention is shown to include an integrally formed annular rim body having annular left and right tire retaining walls 74, and an annular spoke mounting wall 72 interconnecting radial inner edges 741 of the left and right tire retaining walls 74. The tire retaining walls 74 have radial outer edges 742 which bend inwardly toward each other so as to be adapted to engage edge portions of an outer tire body (not shown in FIG. 8). The spoke mounting wall 72 is formed with a set of spoke mounting holes 721 which are angularly displaced from one another. The rim body further includes an annular radial projection 71 which projects radially and outwardly from the spoke mounting wall 72 and which is disposed between the tire retaining walls 74. The radial projection 71 has a pair of side walls 73 which extend radially from the spoke mounting wall 72 and which are proximate to and spaced apart from the tire retaining walls 74, and a bridging wall 76 extending transversely between the side walls 73. The radial projection 71 cooperates with the spoke mounting wall 72 and the tire retaining walls 74 to define a tire retaining cavity 75 which includes two lateral cavity parts 751 on opposite sides of the side walls 73 and an intermediate cavity part 752 between the lateral cavity parts 751. As shown, the lateral cavity parts 751 are deeper than the intermediate cavity part 752 with respect to the radial outer edges 742 of the tire retaining walls 74. The sidewalls 73 project radially and outwardly relative to the bridging wall 76 so as to cooperate with the bridging wall 76 to define a recess 761 which opens in a radial outward direction. The bridging wall 76 is formed with a set of spoke passage holes 762 aligned respectively with the spoke mounting holes 721 in the spoke mounting wall 72. A lining 8 is disposed on the radial projection 71, and has two opposite lateral rim portions 81 resting on the side walls 73, and an intermediate covering portion 82 formed between and interconnecting the rim portions 81. The intermediate covering portion 82 of the lining 8 is formed with a fitting projection 822 which extends fittingly into the recess 761 to cover the spoke passage holes 762. The bicycle wheel rim 8 of the present embodiment is adapted to be installed with a bicycle tire having or not having an inner tire body. A valve unit, such as that shown in FIG. 4, can be mounted on the spoke mounting wall 72 so as to extend into an interior of a tire body of the bicycle tire to permit inflation of the tire body.

It has thus been shown that the bicycle wheel rim 3, 6, 3', 7 of the present invention has a tire retaining cavity 34, 66, 75 with two deeper lateral cavity parts 341, 662, 751 to prevent disengagement of a tire body 4, 62, 92 therefrom.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A bicycle wheel rim comprising an annular rim body with a central axis, said rim body having:

annular left and right tire retaining walls which are spaced apart from each other, each of said tire retaining walls having a radial inner edge proximate to the central axis of said rim body, and a radial outer edge distal to the central axis of said rim body, each of said tire retaining walls further having an intermediate portion between said radial inner edge and said radial outer edge;

an annular spoke mounting wall interconnecting said radial inner edges of said tire retaining walls and formed with a set of spoke mounting holes adapted for retaining spoke fasteners therein; and an annular connecting wall disposed around said spoke mounting wall and extending between said intermediate portions of said tire retaining walls, said connecting wall cooperating with said tire retaining walls to define a tire retaining cavity that opens in a radial outward direction, said connecting wall having a pair of lateral sections formed adjacent to said tire retaining walls, and an intermediate section formed between and interconnecting said lateral sections, said intermediate section projecting radially and outwardly relative to said lateral sections so as to configure said tire retaining cavity to have two opposite lateral cavity parts proximate to said tire retaining walls, respectively, and an intermediate cavity part between said lateral cavity parts, said lateral cavity parts being disposed on opposite sides of said intermediate section of said connecting wall and being deeper than said intermediate cavity part with respect to said radial outer edges of said tire retaining walls.

2. The bicycle wheel rim as claimed in claim 1, wherein said intermediate section of said connecting wall is formed with a set of spoke passage holes aligned respectively with said spoke mounting holes and adapted to permit passage of the spoke fasteners therethrough.

3. The bicycle wheel rim as claimed in claim 2, further comprising an annular lining disposed on said intermediate section of said connecting wall to cover said spoke passage hole.

4. The bicycle wheel rim as claimed in claim 3, further comprising a valve unit mounted on said spoke mounting wall and extending in a radial direction through said connecting wall and said lining to permit inflation of a bicycle tire that is mounted on the tire retaining walls.

5. The bicycle wheel rim as claimed in claim 3, wherein each of said lateral sections of said connecting wall has an outer terminating edge adjacent to the respective one of said tire retaining walls and an inner terminating edge opposite to said outer terminating edge, said intermediate section of said connecting wall having a pair of side walls extending radially and outwardly from said inner terminating edges of said lateral sections, and a bridging wall extending transversely between said side walls, said side walls projecting radially and outwardly relative to said bridging wall so as to define a recess which opens in a radial outward direction.

6. The bicycle wheel rim as claimed in claim 5, wherein said lining has two opposite lateral rim portions resting on said side walls, and an intermediate covering portion extending between said rim portions, said intermediate covering portion having a fitting projection which is received fittingly in said recess.

7. The bicycle wheel rim as claimed in claim 3, wherein said intermediate section of said connecting wall has a pair of rib portions which project radially and outwardly and which are formed adjacent to said lateral sections, respectively, and a bridging portion extending between said rib portions.

8. The bicycle wheel rim as claimed in claim 7, wherein said lining covers said rib portions and said bridging portion of said intermediate section of said connecting wall.

9. The bicycle wheel rim as claimed in claim 1, wherein said rim body is formed integrally as a metal extrusion.

10. A bicycle wheel rim comprising an annular rim body with a central axis, said rim body having:

annular left and right tire retaining walls which are spaced apart from each other, each of said tire retaining walls having a radial inner edge proximate to the central axis of said rim body, and a radial outer edge distal to the central axis of said rim body;

an annular spoke mounting wall interconnecting said radial inner edges of said tire retaining walls and formed with a set of spoke mounting holes adapted for retaining spokes fasteners therein; and an annular radial projection which projects radially and outwardly from said spoke mounting wall and which is disposed between said tire retaining walls, said radial projection cooperating with said spoke mounting wall and said tire retaining walls to define a tire retaining cavity that opens in a radial outward direction, said radial projection including a pair of side walls proximate to and spaced apart from said tire retaining walls, respectively, so as to configure said tire retaining cavity to have two opposite lateral cavity parts proximate to said tire retaining walls, respectively, and an intermediate cavity part between said lateral cavity parts, said lateral cavity parts being disposed on opposite sides of said radial projection and being deeper than said intermediate cavity part with respect to said radial outer edges of said tire retaining walls;

said side walls extending radially and outwardly from said spoke mounting wall, said radial projection further including a bridging wall extending transversely between and interconnecting said side walls and being formed with a set of spoke passage holes aligned respectively with said spoke mounting holes, said side walls projecting radially and outwardly relative to said bridging wall so as to define a recess that opens in the radial outward direction, said bicycle wheel rim further comprising an annular lining disposed on said radial projection, said lining having two opposite lateral rim portions resting on said side walls, and an intermediate covering portion extending between said rim portions, said intermediate covering portion having a fitting projection which is received fittingly in said recess.

* * * * *